(12) United States Patent
Parekh et al.

(10) Patent No.: US 8,681,649 B2
(45) Date of Patent: Mar. 25, 2014

(54) SYSTEM AND METHOD FOR ADAPTIVE OPTIMIZATION OF RESOURCE UTILIZATION FOR REDUNDANCY ELIMINATION

(75) Inventors: Bharat Z. Parekh, Karnataka (IN); Lianjun Jiang, Santa Clara County, CA (US)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 13/195,623

(22) Filed: Aug. 1, 2011

(65) Prior Publication Data

US 2013/0033994 A1    Feb. 7, 2013

(51) Int. Cl.
| | |
|---|---|
| *G01R 31/08* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04N 7/12* | (2006.01) |
| *H04N 11/02* | (2006.01) |
| *H04N 11/04* | (2006.01) |
| *G06F 15/16* | (2006.01) |

(52) U.S. Cl.
USPC .................. 370/252; 375/240.12; 709/203

(58) Field of Classification Search
USPC ......... 370/216–252, 254; 375/240.12, 240.16
See application file for complete search history.

(56) References Cited

U.S. PATENT DOCUMENTS

| | | | | |
|---|---|---|---|---|
| 2004/0120357 | A1* | 6/2004 | Kekki | 370/521 |
| 2008/0294779 | A1* | 11/2008 | Gkantsidis et al. | 709/226 |
| 2011/0282932 | A1* | 11/2011 | Ramjee et al. | 709/203 |
| 2012/0014433 | A1* | 1/2012 | Karczewicz et al. | 375/240.02 |

OTHER PUBLICATIONS

Cisco Systems, Inc. White Paper, "Cisco Wide Area Application Services Software Version 4.4 Technical Overview," © 2011 Cisco Systems, Inc., 24 pages.

* cited by examiner

*Primary Examiner* — Xavier Szewai Wong
(74) *Attorney, Agent, or Firm* — Patent Capital Group (57) ABSTRACT

An example method may include calculating a parameter for traffic propagating in a network between a sender and a receiver, where the traffic comprises encoding information and decoding information; determining whether the parameter meets a predetermined value; classifying the traffic as uni-directional if the parameter meets the predetermined value; and classifying the traffic as bi-directional if the parameter does not meet the predetermined value.

18 Claims, 7 Drawing Sheets

SYSTEM AND METHOD FOR ADAPTIVE OPTIMIZATION OF RESOURCE UTILIZATION FOR REDUNDANCY ELIMINATION

TECHNICAL FIELD

This disclosure relates in general to the field of electronic communications and, more particularly, to a system and a method for adaptive optimization of resource utilization for redundancy elimination.

BACKGROUND

Enterprises face numerous challenges in delivering applications and critical business data across their networks. As an enterprise's workforce becomes more globally and widely distributed, providing adequate network service levels has become increasingly difficult. With continuous pressure from industry and federal regulation, an information technology (IT) department of an enterprise can face a significant challenge in managing costly infrastructure. In certain cases, there is pressure to consolidate this costly infrastructure into a data center, or (separately) to provision scalable, virtualized branch-office application delivery platforms to improve data protection, security, and availability (without sacrificing a service level that the distributed workforce has come to expect).

As applications gain complexity, delivering applications to an enterprise edge becomes increasingly challenging and expensive. Furthermore, in today's environment, IT managers face constant pressure to reduce application delivery costs over the entire network, while maintaining (and even enhancing) application availability, performance, and agility. However, these goals may be difficult to achieve because of poor application response time experienced by users in remote sites. Optimizing data transfers across networks presents a challenge to network operators, component manufactures, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method may include calculating a parameter for traffic propagating in a network between a sender and a receiver, where the traffic comprises encoding information and decoding information; determining whether the parameter meets a predetermined value; classifying the traffic as uni-directional if the parameter meets the predetermined value; and classifying the traffic as bi-directional if the parameter does not meet the predetermined value.

In more specific embodiments, the parameter is entropy, and the predetermined value is a floor, above which the traffic is classified as uni-directional. In other example implementations, the parameter is compressibility, where the predetermined value is a ceiling, below which the traffic is classified as uni-directional. In yet other instances, if the traffic is classified as uni-directional, the method can include writing the encoding information into a first data redundancy elimination (DRE) cache at the sender; and writing the decoding information into a second DRE cache at the receiver.

In certain implementations, the method could also include evaluating the traffic; identifying a pattern that is based, at least, on classifying content within the traffic; and classifying the traffic as uni-directional or bi-directional based on the pattern. Particular infrastructure associated with such activities can include the sender being a data center, the receiver being a branch office, and the network being a wide area network (WAN).

Example Embodiments

Figure 1:
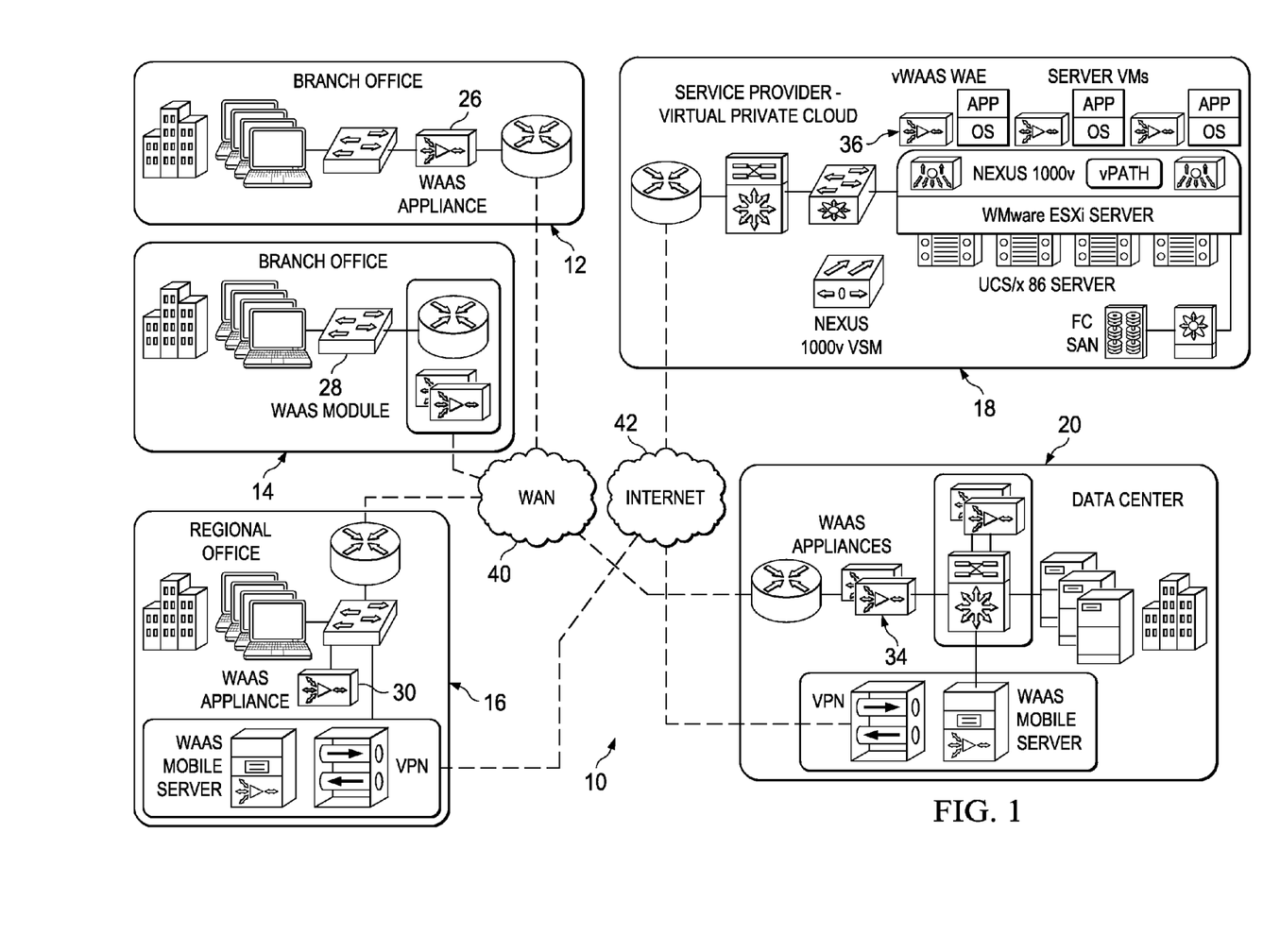
FIG. 1 is a simplified diagram of one embodiment of a communication system in accordance with the present disclosure.

Turning to FIG. 1, FIG. 1 is a simplified block diagram of a communication system 10 for adaptive optimization of resource utilization for redundancy elimination. The example architecture of FIG. 1 may include one or more branch offices 12, 14, and 16 that may communicate with a virtual private cloud 18 and a data center 20 across a network (e.g., a wide area network (WAN) 40), or an Internet network 42. The branch offices may include those offices having (relatively) few workers (e.g., branch offices 12 and 14), medium sized regional offices (e.g., branch office 16), and/or large sized head offices.

A wide area application services (WAAS) module 28 may be deployed in communication system 10 to provide various services such as application specific acceleration and/or WAN optimization capabilities. Multiple WAAS modules may be provisioned throughout the network in various forms, for example, on a physical appliance, a virtual appliance, a router-integrated service module, router blade, or router integrated software on each side of WAN 40. WAAS modules can be deployed physically in-path (e.g., in data center 20 and branch offices 12 and 14) or out-of-path (e.g., branch office 16). For example, branch office 12 may be configured with a WAAS appliance 26; branch office 14 may be configured with WAAS module 28; branch office 16 may be configured with an out-of-path WAAS appliance 30; data center 20 may be configured with a WAAS appliance 34; and virtual private cloud 18 may be configured with a virtual WAAS appliance 36.

WAAS modules (e.g., WAAS appliances 26, 30, and 34, WAAS module 28, and virtual WAAS appliance 36) may comprise an application aware data redundancy elimination (DRE) module that inspects network traffic (e.g., Transmission Control Protocol (TCP) traffic) to identify redundant data at a byte level. WAAS modules may be configured to replace certain data in the network traffic with signatures if the data has been previously seen so that a peer WAAS module (e.g., a WAAS module that receives the data) can use the signatures to reproduce the original data. The application aware DRE module may be configured to identify uni-directional traffic that may be seen in one direction (while not significantly seen in the other direction), and to provide enhanced scalability for redundancy elimination entities by eliminating the storage of actual network traffic (e.g., storage of data on the sending device).

WAAS Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

Certain terminologies are used herein with regard to the various embodiments of the present disclosure. As used herein, "bi-directional traffic" encompasses communication traffic that moves on a network connection (e.g., TCP connection) between communicating devices (e.g., a client and a server) in any direction (e.g., from client to server, from server to client) and includes all forms of communication, including email transmissions, file uploads and downloads, etc. As used herein, "uni-directional traffic" encompasses communication traffic that tends to travel in one direction on a network connection. Examples include traffic from video streams, cloud-based applications (e.g., data backup services), etc. The term "link" as used herein, encompasses a physical or logical communications channel (e.g., a physical transmission medium, such as a wire, or a logical transmission medium, such as a radio channel) that connects two or more communicating devices.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical WAN optimization products employ DRE techniques to reduce traffic volume on a network by running an instance of DRE software or hardware on each end of a network link (e.g., WAN link). For example, DRE entities inspect TCP traffic to identify redundant data patterns, and then replace the data patterns with signatures that a peer device (e.g., another DRE entity) on the other side of the WAN link can use to reproduce the original data. As new data patterns are identified, they are added to a DRE database, and they can then be used in the future to help eliminate transmission of redundant data. With such DRE techniques, redundant data patterns are replaced with smaller signatures that instruct the distant device about how to rebuild the original message safely. DRE helps reduce bandwidth consumption, and improves latency because fewer packets have to be exchanged over the WAN to achieve the same level of throughput. Patterns that have been learned from one application flow can be used when another flow (even from a different application) is observed.

Network traffic employing DRE techniques generally comprises data and associated metadata. The term "metadata" encompasses a mapping between original data bytes and corresponding signatures that are used to replace the data bytes. Examples of metadata include "sigblocks" (signature blocks) (e.g., a data structure that stores chunk signatures and section definitions), anchor signatures (e.g., a base chunk selected as an index into redundant data patterns and used for encoding), and section signatures (e.g., a hash value calculated for chunk signatures contained in the data and used for decoding). Data may be stored as raw data storage (e.g., data structures). Before transmitting data, a DRE entity typically divides input data into chunks (i.e., sequences of consecutive bytes forming a basic unit of redundancy), performs a lookup in its cache to identify chunk signatures that correspond to the chunks, and replaces redundant chunks with chunk signatures. Groups of chunks with content-based boundaries may be grouped into sections with corresponding section signatures.

Data may be encoded using sigblocks and metadata for encoding (e.g., anchor signatures). Encoding can include dividing input data into chunks to find redundant patterns and, further, replacing the redundant data patterns with signatures. Compression can be achieved by sending the encoded data including chunk signatures and associated metadata, instead of corresponding larger sections of raw data over the network. At the receiving end, data may be decoded from raw data storage and metadata for decoding (e.g., section signatures).

Encoding information and decoding information (e.g., metadata for encoding such as anchor signatures, metadata for decoding such as section signatures, metadata with chunk signatures and section definitions such as sigblocks, and raw data storage) are typically treated as a bundled quantity. Whenever data (e.g., a file) is requested, both metadata (e.g., anchor signatures, section signatures, and sigblocks) and raw data (e.g., raw data storage) are written to caches at both sender and receiver. Whenever this data is removed from the cache, both metadata and raw data are removed together. The encoding information may include metadata for encoding (e.g., anchor signatures and sigblocks), where decoding information may include raw data storage and metadata for decoding (e.g., section signatures).

DRE entities may cache the data and associated metadata on both sides of a WAN link. Certain metadata (e.g., encoding information) may be cached for encoding and/or compressing the traffic, and certain data and metadata (e.g., decoding information) may be cached for decoding and/or decompressing the traffic. A cache can be configured to store data so that future requests for that data can be served faster. If requested data is contained in the cache, the request can be served by simply reading (or accessing) the cache, which is comparatively faster than fetching the data from its original storage location, such as a user's computer disk, a database server, etc.

A computer in a branch office that requests data already requested by another computer in the same branch office can retrieve the data from the branch office cache: rather than pulling it across the WAN link from the original location of the data (such as a data center content server). For example, a first requesting computer in a branch office can request a file from a content server in a data center. The content server has computed and stored metadata, along with signatures associated with the file in its cache. The requesting computer can download the file (including data and metadata) from the content server. The requesting computer can then cache the file and its associated metadata in its branch office cache. The cache may be collocated with the computer itself (e.g., distributed cache mode) or on a hosted cache server (e.g., hosted cache mode). This data caching method can allow branch office users to access centralized data at local area network (LAN)-like speeds over the WAN. Thus, content distribution and caching help improve client performance by optimizing transmissions of data within the branch office so that user response times feel "local."

Typically, in a WAN network, DRE entities cache network traffic on both sides of the WAN link in a symmetric manner. This symmetric caching imposes an equal amount of resource utilization on entities on each side of the WAN link. Such resource requirements can become a scalability bottleneck especially for an entity that is peering with a larger number of peers (e.g., a data center DRE entity). For example, a data center may communicate with multiple branch offices simultaneously. The data center's DRE entity may cache metadata and data separately for each receiver: even if the requested content is the same from more than one receiver. Resource requirements for the DRE entity caching traffic at the data center are therefore significantly higher.

In general, communication traffic may be bi-directional or uni-directional. However, typical WAN optimization products assume that network traffic is symmetric (e.g., bi-directional). For example, a large amount of traffic flows in one direction from a data center towards branch locations. A significant percentage of such traffic that is seen would not be seen in the other direction (i.e., from the branch locations to the data center). There is more egress traffic from such locations compared to the ingress traffic. This may mean that a majority of such traffic is encoded traffic (e.g., traffic coming into the DRE entity from a client or server) that may be compressed (e.g., with Lempel-Ziv (LZ) compression) before DRE techniques are applied, and the traffic is subsequently sent on to the receiver.

A problem surfaces in such a paradigm because typical DRE entities cache data and metadata symmetrically on both sides of the communication link: irrespective of the bi-directional or uni-directional nature of the traffic. This is because DRE entities cannot distinguish between bi-directional and uni-directional traffic. However, symmetric caching for uni-directional traffic imposes inefficiencies and high costs on network infrastructure. There are certain mechanisms, such as single-instance storage, that try to provide resource optimization when the same content is transferred to different remote peers. For example, single-instance storage enables automatic archival of only one instance of a document that has been saved multiple times (e.g., the same email attachment that has been sent to multiple people). This avoids multiple versions of the same file and, further, significantly reduces storage space. However, if there is no significant sharing of the same content across different peers, then there is no significant resource optimization.

Communication system 10 is configured to address these issues (and others) in offering an architecture for the adaptive optimization of resource utilization for redundancy elimination. In certain implementations, the WAAS modules (e.g., WAAS appliances 26, 30, and 34, WAAS module 28, and virtual WAAS appliance 36) can provide a mechanism to identify a subset of traffic that is asymmetric in nature and, therefore, may not be observed in the opposite direction (e.g., uni-directional traffic). Components of communication system 10 may also provide for storage scalability for a DRE entity by eliminating the need for storing data traffic that may not be seen in the other direction. Mechanisms described in this disclosure may additionally eliminate the need for storing actual traffic for encoding/compressing, which can encompass a significant percentage of the traffic. Additionally, such an approach can offer significant storage/cache savings, which are not afforded by single-instance storage solutions. Certain redundancy protocols outlined herein may store metadata and data selectively for uni-directional traffic, which can increase the storage scalability of the associated DRE entity. Moreover, features of the present disclosure can allow for resource optimization whether or not the same content is shared across different peers.

In operation, communication system 10 can calculate entropy of the data in order to identify uni-directional traffic. If the entropy of the traffic is high, then such traffic may not be seen in the reverse direction (e.g., it may be uni-directional), or it may not be an appropriate fit for a redundancy elimination algorithm, when it is seen in the reverse direction (e.g., data file downloaded in one direction, from server to client, may have been modified significantly when uploaded back in the reverse direction, from client to server). As used herein, "entropy" is an expected value of information contained in a message. Further, entropy may represent an absolute limit on the best available lossless compression of a communication. Entropy of data can be inversely proportional to compressibility of the data; the greater the entropy, the smaller the factor by which the data can be compressed. Embodiments of the present disclosure can also calculate the compressibility of data (e.g., using standard algorithms such as Lempel-Ziv (LZ), BZIP2, etc.) and, further, use the compressibility to identify uni-directional traffic (e.g., if the compressibility of the data is low, then the traffic may be more likely to be uni-directional). Additional details associated with these activities are provided below. Before turning to those discussions, example infrastructure is provided for purposes of explanation and teaching.

Turning to the infrastructure of FIG. 1, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection, for example, to data center 20, through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In addition, gateways, routers, switches, and any other suitable network elements may be used to facilitate electronic communication between various nodes, for example, between data center 20 and branch offices 12-16, and virtual private cloud 18. Additionally a 'sender' and a 'receiver' may be any electronic device, node, network element, client, server, terminal, peer, service, application, endpoint, switch, console, proprietary component, telephone, bridge, computer, personal digital assistant (PDA), laptop or electronic notebook, i-Phone, iPad, Google Droid, any other type of smartphone, a Telepresence system, an access point, network appliances, routers, gateways, loadbalancers, firewalls, processors, modules, or any other device, component, element, or object capable of facilitating packet communications. This can include any type of voice, audio, or data exchanges in a network environment. Additionally, the network illustrated in FIG. 1 may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs.

In an example embodiment, branch offices 12-16 may include end user computers that could be operated by end users. The end user computers may include desktops, laptops, mobile or handheld computers (e.g., personal digital assistants (PDAs), mobile phones, etc.), or any other type of computing device operable by an end user. It should be noted that the network configurations and interconnections shown and described herein are for illustrative purposes only. FIG. 1 is intended as an example and should not be construed to imply architectural limitations of the present disclosure.

In an example embodiment, virtual private cloud 18 (e.g., a private cloud existing within a shared or public cloud, enterprise cloud, etc.) may include a wide area application engine (WAE), which may comprise a portfolio of powerful, scalable network appliances that host WAN optimization and application acceleration solutions. This may include virtual WAAS appliance 36, where such a configuration can enable branch office server consolidation and performance improvements for centralized applications. Additionally, such a configuration can provide remote users with LAN-like access to applications, storage (e.g., fiber channel storage area networks (FC SAN), and content across Internet 42. The WAE may be coupled to suitable switches such as Cisco® Nexus 1000v, and servers (e.g., UCS/x86 server, etc.) based on particular implementations and needs. As shown in the example embodiment of FIG. 1, virtual private cloud 18 may be connected to branch offices (e.g., regional office 16) and/or data center 20 via Internet 42, for example, over mobile servers running suitable WAAS modules.

In an example embodiment, data center 20 may be configured with appropriate content servers, mobile servers, and other network devices running various communication protocols (e.g., Internet Protocol (IP)). Data center 20 may contain routers and switches to transport traffic between the servers and the outside world across networks such as WAN 40 and Internet 42. Some of the servers at data center 20 may be used for running Internet and intranet services (e.g., e-mail servers, proxy servers, and DNS servers).

According to example embodiments of the present disclosure, small branch offices (e.g., branch offices 12 and 14) can use integrated switching at the edge of the network, where this provisioning may depend on the number of users and the size of the office. Larger sized branch offices, such as regional office 16, may adopt a multilayered architecture for high availability and scalability requirements. Irrespective of the type of architecture or communication layer (edge, distribution, access, etc.), WAAS modules may be implemented at branch offices to provide redundancy elimination and optimization.

Figure 2:
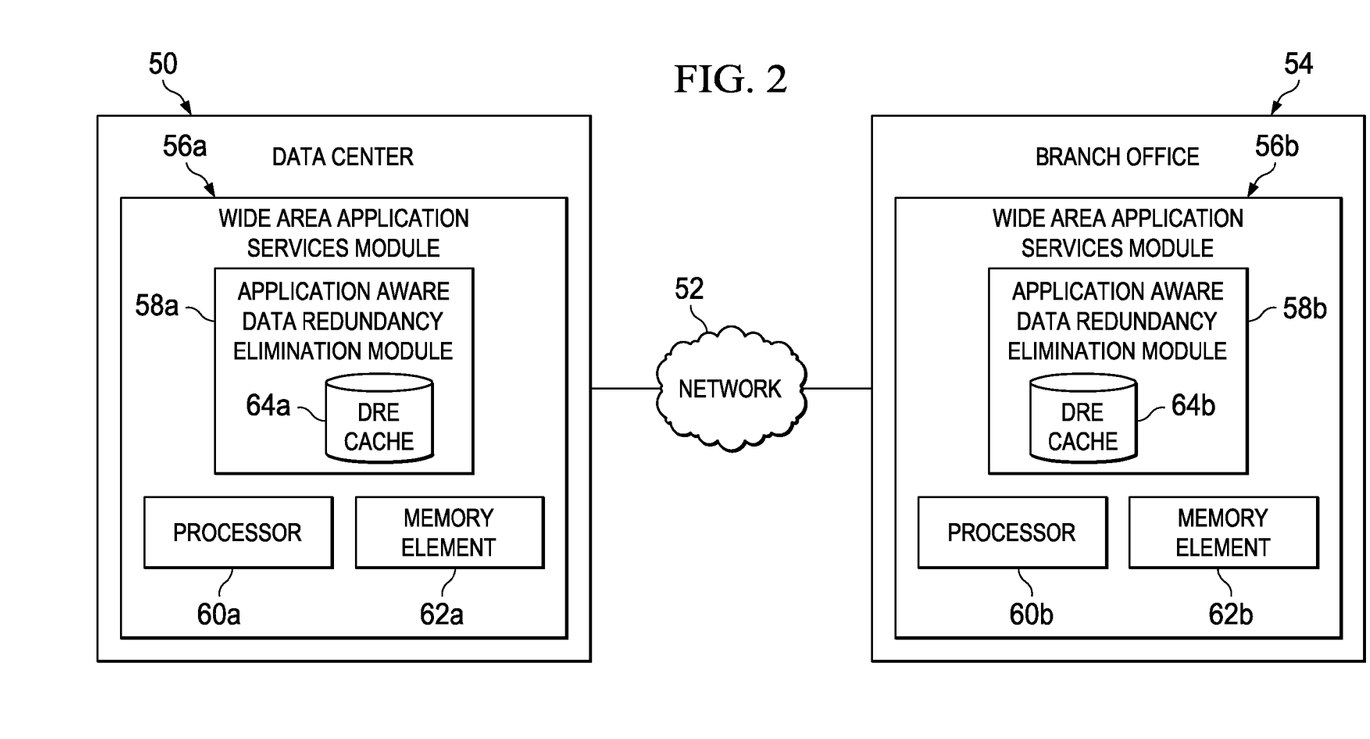
FIG. 2 is a simplified block diagram of additional details of the communication system in accordance with the present disclosure.

Turning to FIG. 2, FIG. 2 is a simplified block diagram showing additional details of example embodiments according to the present disclosure. A data center 50 may communicate over a network 52 with a branch office 54. Data center 50 and branch office 54 may include WAAS modules 56a and 56b, respectively. WAAS modules 56a and 56b may contain application aware DRE modules 58a and 58b, one or more processors 60a and 60b, and one or more memory elements 62a and 62b. Application aware DRE modules 58a and 58b may include DRE caches 64a and 64b, respectively.

In an example embodiment, DRE caches 64a and 64b may comprise memory cache and disk cache. In other example embodiments, DRE caches 64a and 64b may comprise only memory cache, only disk cache, or a combination thereof. Memory cache may include a portion on a high-speed Static Random Access Memory (SRAM) element, for example, on memory elements 62a and 62b. Memory cache may reside on a central processing unit (CPU), for example, on processors 60a and 60b. Like memory caching, disk caching may be used to access commonly accessed data. However, instead of using high-speed SRAM, a disk cache may use a main memory or a memory buffer. For example, the most recently accessed data from the disk can be stored in a memory buffer. When a program needs to access data from the disk, it may first check the disk cache to identify if the data is in the disk cache. A DRE cache (e.g., a DRE cache 64a or 64b) may be located on a single device (e.g., a server), and may share resources (e.g., CPUs). Alternatively, a DRE cache may be distributed on multiple hosts over a network.

Application aware DRE modules 58a and 58b can be configured for bi-directional traffic, where each data chunk (i.e., a sequence of consecutive bytes forming a basic unit of redundancy) and corresponding chunk signature are written to DRE caches at both a sender and a receiver (e.g., DRE caches 64a and 64b), for example, to provide optimal compression. Application aware DRE modules 58a and 58b may also be configured for uni-directional traffic, where metadata (e.g., anchor signatures and sigblocks) may be written to the DRE cache at the sender (e.g., DRE cache 64a if data center 50 is the sender), and the data (e.g., section signatures and raw data storage) can be written to the DRE cache at the receiver (e.g., DRE cache 64b if branch office 54 is the receiver). In addition to providing optimal compression, this mode can effectively use the DRE caches for higher scalability.

Application aware DRE modules 58a and 58b may also be configured to identify and classify traffic (i.e., adaptive mode), where such components have the intelligence to choose between bi-directional and uni-directional DRE caching mechanisms, depending on the type of application traffic (i.e., whether the traffic is bi-directional or uni-directional). Application aware DRE modules 58a and 58b can also store signatures in the data center on a per-branch office basis, and the actual data sections may be shared across branch offices. Tight synchronization of branch office signatures, combined with shared sections of data across branch offices, can help to provide consistent, reliable, and fair DRE performance for all branch offices. In certain instances, application aware DRE modules 58a and 58b may use metadata (e.g., anchor signatures and sigblocks) for compressing/encoding, and may not use the data (e.g., raw data storage and section signatures) for compressing/encoding. Alternatively, application aware DRE modules 58a and 58b may use the data for decompressing/decoding and may not use metadata for decompressing/decoding.

Figure 3:
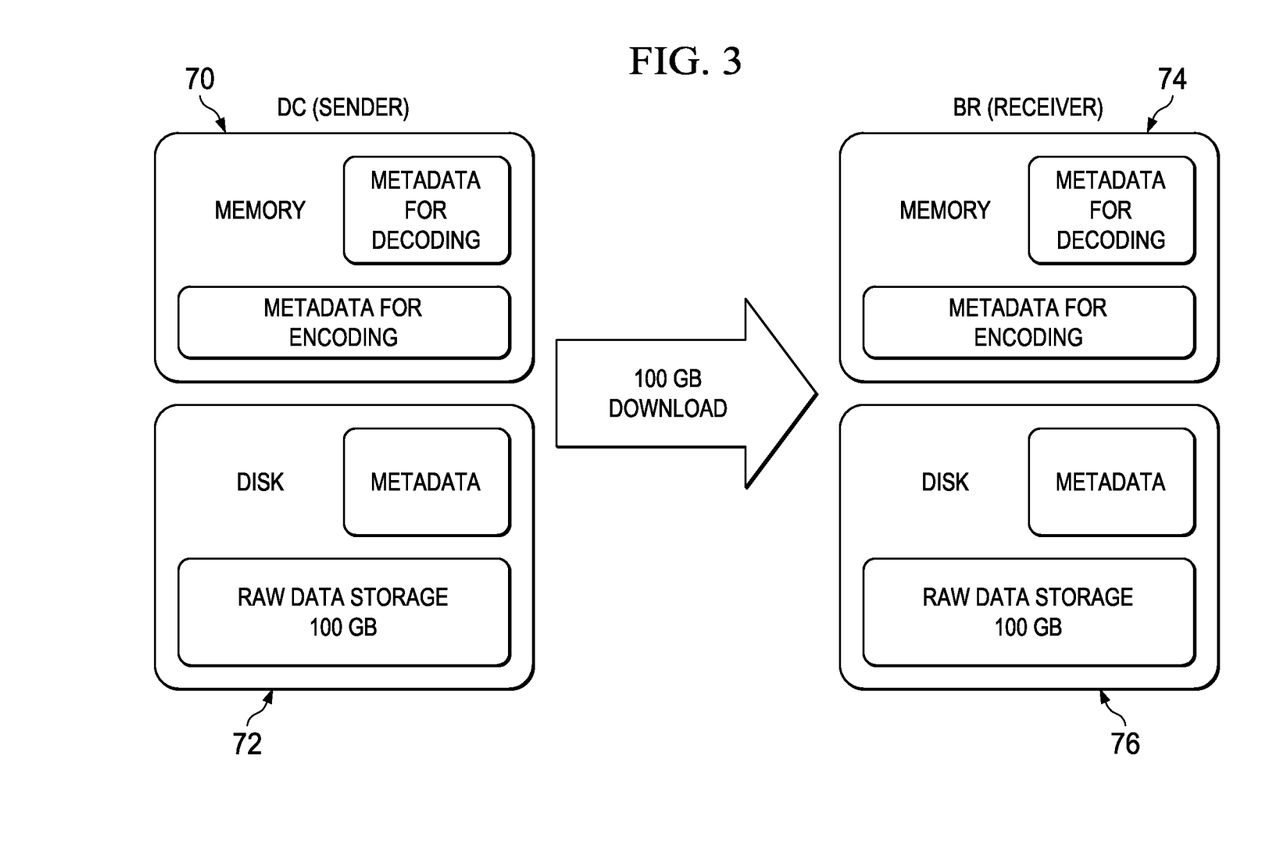
FIG. 3 is a simplified block diagram showing an example storage configuration according to an embodiment of the present disclosure.

Turning to FIG. 3, FIG. 3 illustrates a simplified block diagram showing a 100 GB data transfer according to an example DRE architecture and design. In the example shown in FIG. 3, 100 GB of non-redundant data is downloaded for the first time ("cold pass") from a data center, which is a sender, to a branch office, which is a receiver in this scenario. A DRE entity at the data center may write encoding information, including metadata (e.g., sigblocks) and metadata for encoding (e.g., anchor signatures), to any appropriate location (e.g., a memory 70 and a disk 72). The decoding information may include raw data storage, where such information, along with metadata for decoding (e.g., section signatures), can be written into memory 70 and disk 72. In the example shown in FIG. 3, raw data storage may use 100 GB of disk space of disk 72. Similarly, a DRE entity at the branch office may also write metadata and data into a memory 74 and a disk 76 appropriately, with raw data storage using 100 GB of cache space.

Figure 4:
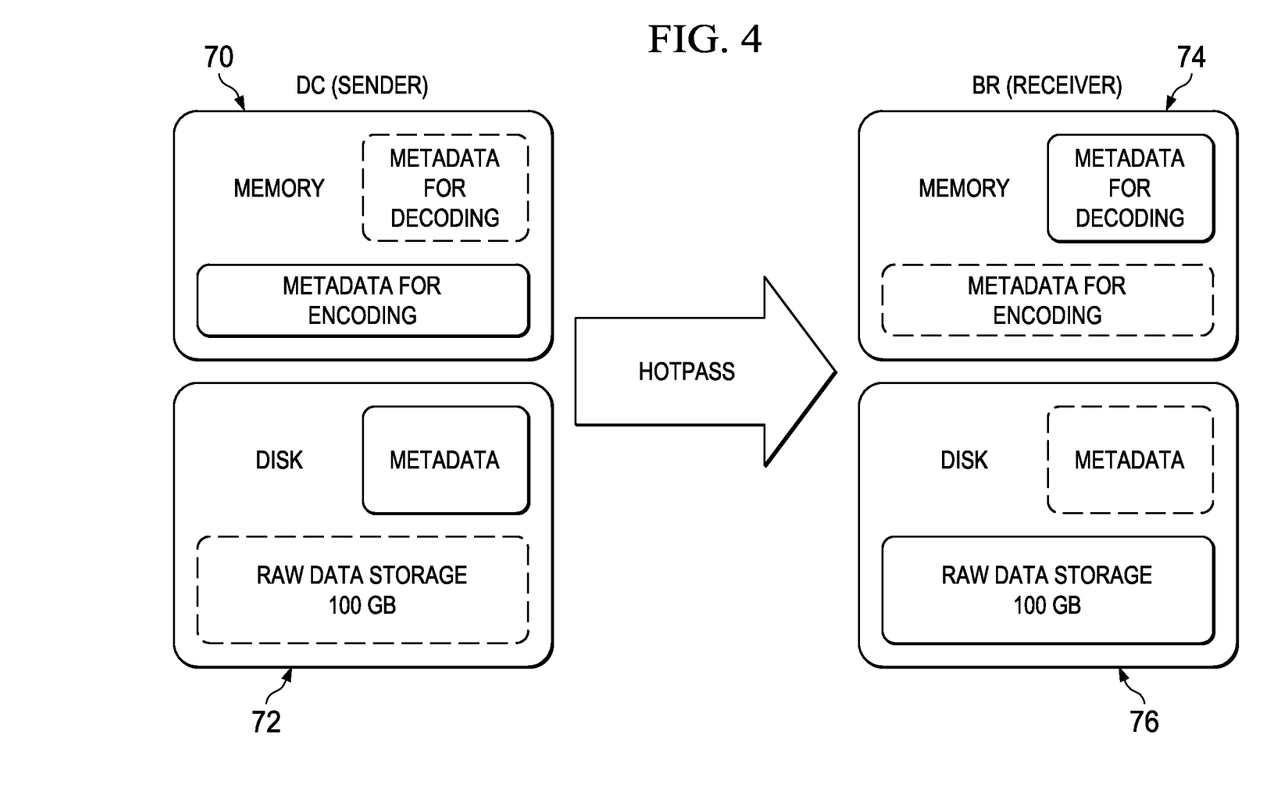
FIG. 4 is a simplified block diagram showing another example storage configuration according to an embodiment of the present disclosure.

Turning to FIG. 4, FIG. 4 illustrates a simplified block diagram showing an example 100 GB repeated data transfer according to an example DRE architecture and design. According to the example of FIG. 4, the same 100 GB of data as described in reference to FIG. 3 is transferred again ("hot pass"). When the same 100 GB of data is transferred from the data center to the branch office again, corresponding DRE entities can use encoding information for encoding the data, and decoding information for decoding the data (although these entities write substantially all the metadata and data into the respective caches, as described in connection with FIG. 3). To clarify this distinction between using and writing metadata and data, information that is written but not used for encoding/decoding is shown with dotted lines in FIG. 4. As shown in FIG. 4, encoding information (e.g., anchor signatures and sigblock) is used by the sender (e.g., anchor signatures from memory 70 and sigblock from disk 72) and decoding information is used by the receiver (e.g., section signatures from memory 74 and raw data storage from disk 76) to recreate the original 100 GB of data. Thus, in the second pass and in subsequent instances, although the DRE entities may write (and rewrite) metadata and data into respective caches, only a part of the stored cache is used by the respective entities for encoding and decoding.

Figure 5:
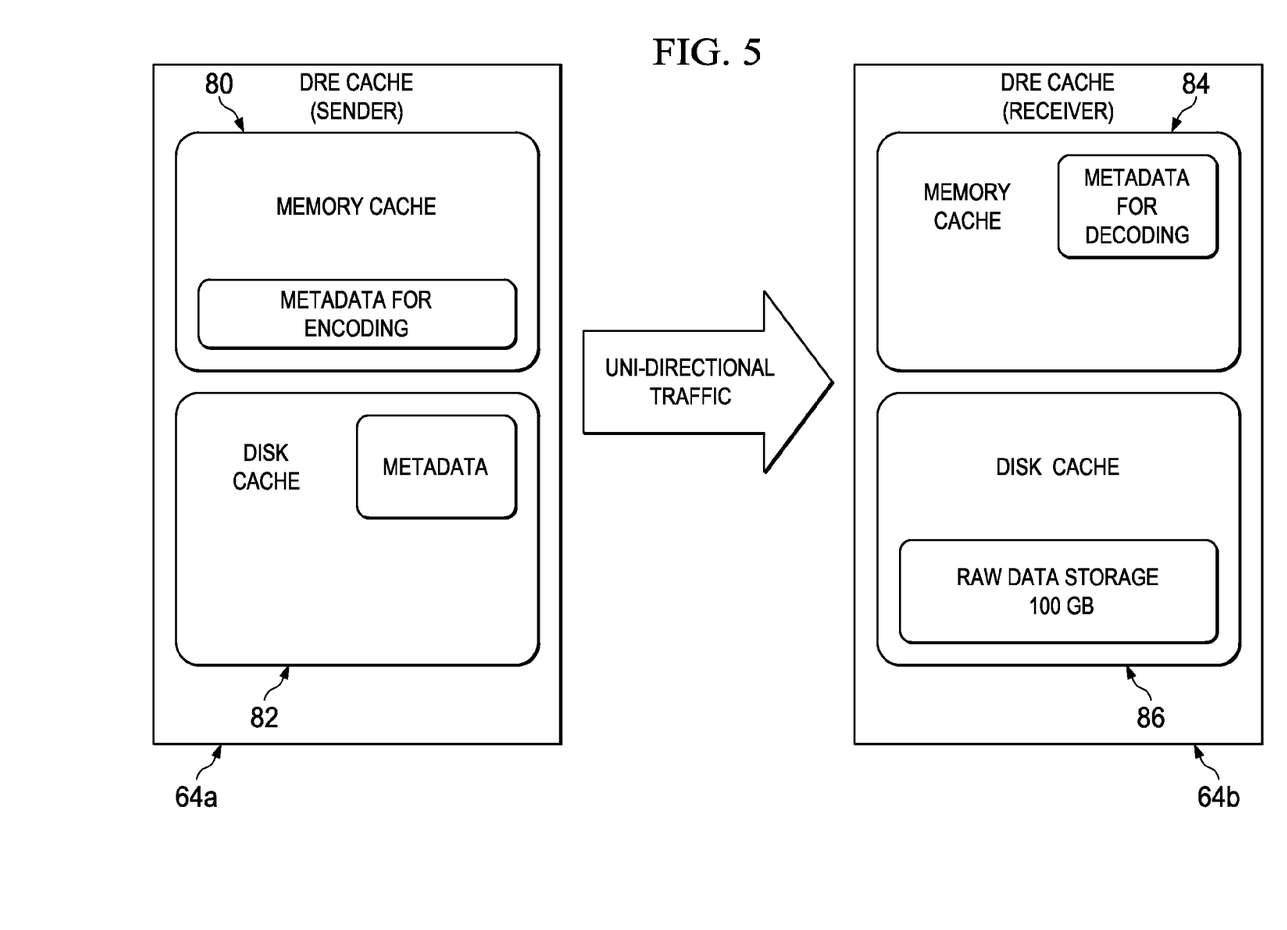
FIG. 5 is a simplified block diagram showing another example storage configuration according to an embodiment of the present disclosure.

Turning to FIG. 5, FIG. 5 illustrates a simplified block diagram showing 100 GB uni-directional traffic between components of communication system 10 according to embodiments of the present disclosure. 100 GB of data is downloaded from data center 50 to branch office 54 (both of which are illustrated in FIG. 2). Data center 50 can include an application aware DRE module comprising DRE cache 64a, which is being depicted in FIG. 5. In the example embodiment shown in FIG. 5, DRE cache 64a includes a memory cache 80 and a disk cache 82. Branch office 54 includes an application aware DRE module comprising DRE cache 64b. In the example shown in FIG. 5, DRE cache 64b comprises a memory cache 84 and a disk cache 86.

According to embodiments of the present disclosure, DRE cache 64a (at the sender) is configured to write encoding information (e.g., metadata for encoding such as anchor signatures written to memory cache 80 and sigblock written to disk cache 82). Similarly, DRE cache 64b (at the receiver) writes decoding information (e.g., metadata for decoding such as section signatures written to memory cache 84 and raw data storage written to disk cache 86). In the example shown in FIG. 5, cache usage for data by DRE cache 64b is 100 GB, while DRE cache 64a does not write raw data into cache and, therefore, saves cache storage space accordingly.

According to embodiments of the present disclosure, decoding information (e.g., raw data storage and section signatures) may not be stored at the sender (i.e., in DRE cache 64a) and encoding information (e.g., anchor signatures and sigblocks) may not be stored at the receiver (i.e., in DRE cache 64b). The process of selectively storing encoding information on the sender and decoding information on the receiver is referred to herein as a "uni-directional cache." A uni-directional cache can provide better DRE cache storage scalability when a significant percentage of traffic is uni-directional. For example, if there are 10 branch offices with 100 GB of DRE cache requirement for data download from a data center, 1 TB of DRE cache storage (corresponding to 10 times 100 GB) may be used on the data center if a uni-directional cache is not implemented. With a uni-directional cache implemented, approximately 50 GB of disk may be used instead of 1 TB while providing a substantially similar level of compression.

With a uni-directional cache design, encoding and decoding information need not be bundled. Admission and replacement of data (e.g., raw data storage) and metadata (e.g., sigblocks) may be tracked separately. In an example embodiment, there may be two FIFOs: one for sigblocks and one for data units. For example, an old sigblock may be dropped in favor of a new sigblock if the sigblock FIFO is full. According to embodiments of the present disclosure, the sigblock and data FIFO size may be predetermined for each platform. In other embodiments, the sigblock and data FIFO size may be determined based on platform independent considerations.

The amount of addressable cache space that DRE caches 64a and 64b can provide may depend on various factors, including: (1) total storage available for data (e.g., raw data storage); (2) total storage available for metadata (e.g., sigblocks); and (3) amount of memory available for in-memory metadata (e.g., anchor signatures and section signatures stored in memory cache). Of the above three factors, total addressable cache space may be determined by the entity (either disk or memory) that has the least amount of storage space available. Since addressable cache space can also depend upon the actual traffic pattern (e.g., sharing percentage, uni-directional vs. bi-directional, encoding vs. decoding, etc.). Additionally, the application aware DRE module can cause metadata storage (and also data storage) to adjust dynamically to provide optimal cache address space.

Figure 6:
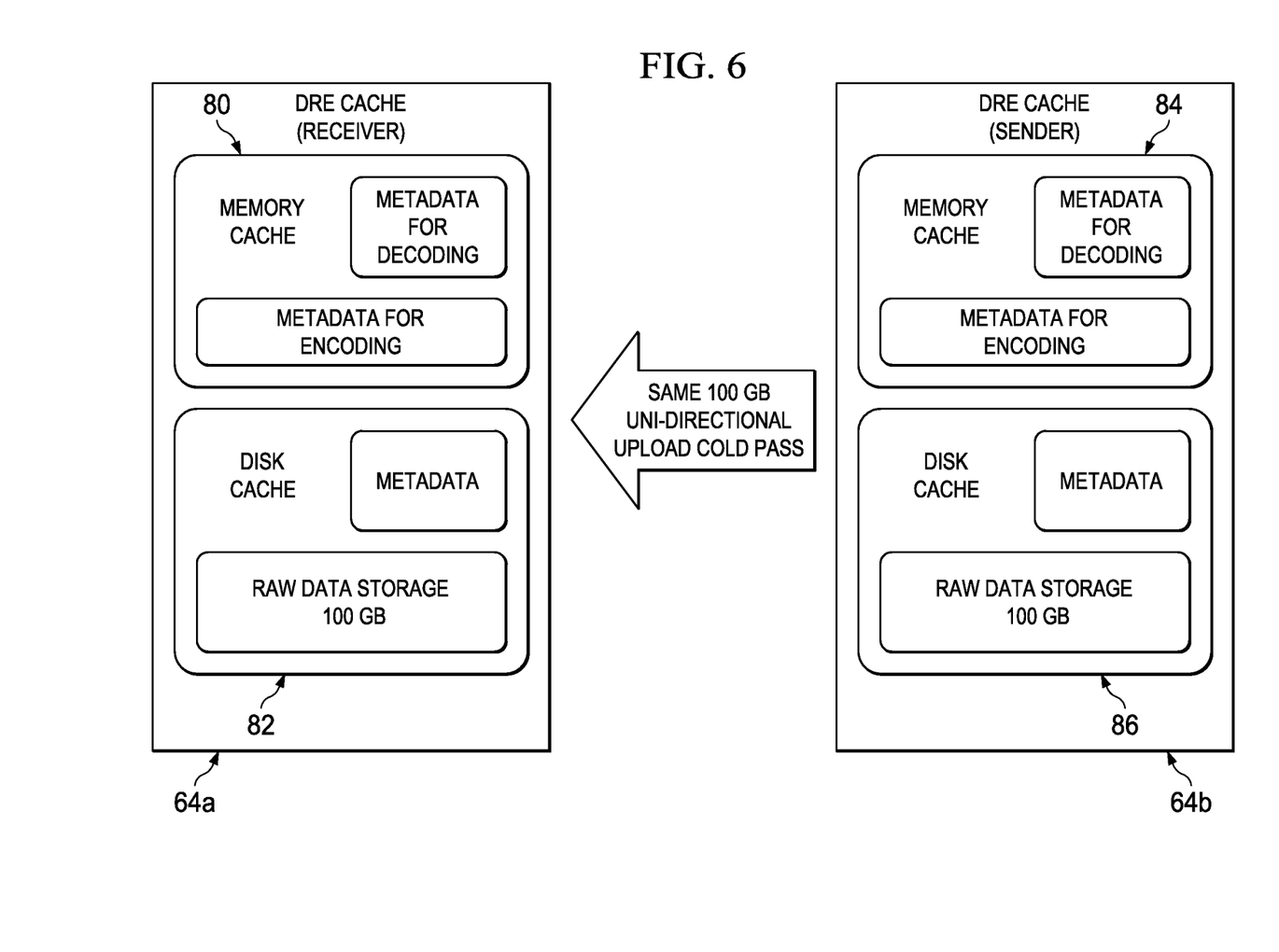
FIG. 6 is a simplified block diagram showing another example storage configuration according to an embodiment of the present disclosure.

Turning to FIG. 6, FIG. 6 is a simplified block diagram showing a 100 GB uni-directional upload cold pass according to example embodiments of the present disclosure. FIG. 6 shows the reverse traffic of the uni-directional traffic scenario described in reference to FIG. 5. In the scenario shown in FIG. 6, the sender (i.e., branch office 54) may write encoding information into DRE cache 64b (e.g., anchor signatures written to memory cache 84 and sigblock written to disk cache 86). The receiver (i.e., data center 50) may write decoding information into DRE cache 64a (e.g., section signatures written to memory cache 80 and raw data storage written to disk cache 82). Thus, at the end of the transfer, the respective caches may have cached the same information (i.e., encoding and decoding information) as described in connection with current DRE architecture in FIG. 3. Subsequent traffic flows of the same data in both directions can get DRE compression and any other suitable optimization based on particular implementation and needs.

Thus, in certain instances, DRE cache storage may be saved in a first direction, at the cost of a one-time loss of DRE compression in the reverse direction. However, because in a typical data center-to-branch office situation, traffic is generally uni-directional, where such occurrences of bi-directional traffic are rare and the benefits of cache storage savings can outweigh the aforementioned cost of loss in DRE compression. Moreover, when access patterns include downloading and uploading of similar content, the application aware DRE module may intelligently classify traffic as bi-directional or uni-directional, and suitably write metadata and data to the appropriate DRE caches.

Figure 7:
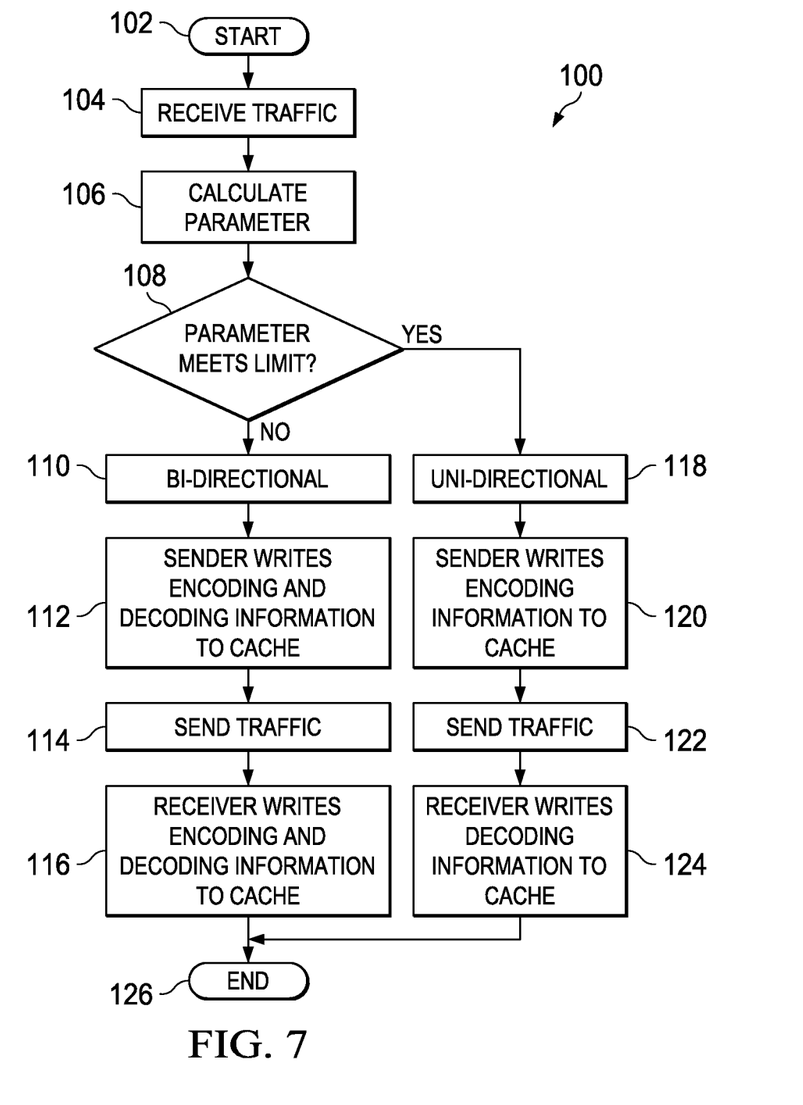
FIG. 7 is a simplified flowchart showing example operational activities that may be associated with embodiments of the present disclosure.

Turning to FIG. 7, FIG. 7 is a simplified flowchart showing example operational activities 100 associated with embodiments of the present disclosure. Embodiments of the present disclosure can classify traffic as bi-directional or uni-directional and appropriately store data and metadata. For example, in the case of bi-directional traffic, both the metadata (for encoding) and the data (for decoding) may be written into appropriate DRE caches at a sender and a receiver during a cold pass. In contrast, for uni-directional traffic, metadata may be written into a DRE cache at the sender side, and data may be written into a second DRE cache at the receiver side.

The particular flow of FIG. 7 may begin at 102, when application aware DRE module 58a of a sender is activated. In 104, application aware DRE module 58a can receive traffic from a client or a server. For example, the traffic may comprise a data file from a content server in data center 50 that has been requested by branch office 54. Application aware DRE module 58a can calculate a parameter of the traffic in 106. The actual 'parameter' being calculated can include any number of network traffic characteristics. For example, in one particular implementation, the parameter may be associated with entropy (which is inclusive of any derivation thereof, or any algorithm that factors in entropy). Entropy may be calculated by any known means, for example, using Shannon entropy calculations, or through any other suitable methodologies.

In another example embodiment, the parameter may be compressibility. Compressibility of the traffic may be calculated by any known means, for example, using LZ compression methods. In yet another example embodiment, the parameter may be content-based classification or hints provided by suitable application optimizers (AO) coupled to WAAS module 56a. Any other suitable parameters that characterize the traffic (and which can help to distinguish between bi-directional and uni-directional traffic) may be used without departing from the scope of the present disclosure. Such parameters may involve a sender and a receiver, or any other set of network nodes. Additionally, such parameters may be based on any particular network configuration, or specific traffic management needs.

The previously identified parameter is then checked against a predetermined value. Note that the 'predetermined value' is inclusive of an approximate number, an absolute number, a threshold, a ceiling, a floor, a watermark, or any other characteristic that defines some value or boundary to be evaluated. In 108, application aware DRE module 58a determines if the parameter meets the predetermined value. In general, uncompressible traffic (i.e., traffic with high entropy and low compressibility such as video, images, and encrypted traffic) is commonly not sent in a reverse direction without any change. For example, users typically download videos more frequently than they upload the same videos. Any video upload may be representative of new content, or significantly modified content. Thus, high entropy or low compressibility may signify uni-directional traffic.

In an example embodiment, where the parameter is entropy, the predetermined value may be a floor, above which the traffic is classified as uni-directional. Thus, the entropy "meets" the predetermined value if it is equal to or greater than the limit. In another example embodiment, where the parameter is compressibility, the predetermined value may be a ceiling, below which the traffic is classified as uni-directional. Thus, the compressibility "meets" the predetermined value if it is equal to or less than the limit. In yet another example embodiment, where the parameter is a hint from suitable AOs, the predetermined value may be a specific value or expression in the data content. Thus, the hint "meets" the predetermined value if it contains the specific value or an expression comprising the limit. In other embodiments, where other parameters are used, the term "meet" may depend on a particular nature of the parameter and the limit, for example, whether the limit is a ceiling, a floor, or a specific value (or an expression).

If the parameter does not meet the predetermined value, as determined in 108, the traffic may be classified as bi-directional in 110. In an example embodiment, if the entropy of the traffic is low and does not meet the predetermined value, as determined in 108, the traffic can be classified as bi-directional. In another example embodiment, if compressibility of the traffic is high and exceeds the predetermined value determined in 108, the traffic is classified as bi-directional. In yet another example embodiment, if the data content does not contain the specific value or expression provided by suitable AOs, the traffic is classified as bi-directional. The sender (e.g., data center 50) can write encoding and decoding information into DRE cache 64a in 112. The traffic can be encoded and sent to the receiver (e.g., branch office 54) in 114. The receiver writes encoding and decoding information into its DRE cache (e.g., DRE cache 64b) in 116.

Alternatively, if the parameter meets the predetermined value, as determined in 108, the traffic is classified as uni-directional in 118. In an example embodiment, if entropy of the traffic is high and meets or exceeds the predetermined value, the traffic is classified as uni-directional. In another example embodiment, if compressibility is low and meets or is lower than the predetermined value, the traffic is classified as uni-directional. In yet another embodiment, if the data content contains the specific value or expression provided by suitable AOs, the traffic is classified as uni-directional.

The sender (e.g., data center 50) may compute and write encoding information (e.g., metadata for encoding such as anchor signature, and metadata such as sigblock) to DRE cache 64a in 120. Traffic is encoded and sent to receiver (e.g., branch office 54) in 122. The receiver writes decoding information (e.g., metadata for decoding such as section signature and raw data storage) into its DRE cache (e.g., DRE cache 64b) in 124 and the traffic is decoded. The flow can end in 126, where similar operations can be repeated for subsequent flows.

In example implementations, at least some portions of the activities related to the adaptive optimization of resource utilization for redundancy elimination outlined herein may be implemented in software in, for example, in WAAS module 28 and/or WAAS appliance 26. In some embodiments, one or more of these features may be implemented in hardware, provided external to these elements, or consolidated in any appropriate manner to achieve the intended functionality. WAAS module 28 and/or WAAS appliance 26 may include software (or reciprocating software) that can coordinate in order to achieve the operations, as outlined herein. For example, this could include application aware DRE modules 58a-58b. In still other embodiments, these elements may include any suitable algorithms, hardware, software, components, modules, interfaces, or objects that facilitate the operations thereof.

Furthermore, WAAS modules and WAAS appliance described and shown herein (and/or their associated structures) may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 62a-b) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processors 60a-60b could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory elements 62a-b) for storing information to be used in achieving operations associated with adaptive optimization of resource utilization for redundancy elimination as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It should also be noted that, as used herein, the term "entity" encompasses hardware components, such as motherboards, network interfaces, processors, memory, storage, etc., and software components, such as software packages, web services, modules that encapsulate a set of related functions (or data), etc. Software components can encompass data structures and algorithms applied to the data structures. In a typical scenario, an application server comprising hardware components may run several software components. In a distributed computing scenario, a combination of application servers (comprising a plurality of hardware components) and software components may be used to provide desired functionalities.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which traffic management is being executed. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for improving caching in data redundancy elimination (DRE) entities, comprising:
    calculating a parameter for traffic propagating in a network between a sender and a receiver, wherein the parameter includes one or more network traffic characteristics which indicates whether the traffic is uni-directional network traffic or bi-directional network traffic, and the traffic comprises encoding information and decoding information;
    determining whether the parameter meets a predetermined value;
    classifying the traffic as uni-directional if the parameter meets the predetermined value; and
    classifying the traffic as bi-directional if the parameter does not meet the predetermined value;
    if the traffic is classified as uni-directional, causing a first DRE cache at the sender to maintain encoding information and to not maintain decoding information, and causing a second DRE cache at the receiver to maintain decoding information and to not maintain encoding information; and
    if the traffic is classified as bi-directional, causing the first DRE cache to maintain both encoding information and decoding information, and causing the second DRE cache to maintain both encoding information and decoding information.

2. The method of claim 1, wherein the parameter is entropy.

3. The method of claim 2, wherein the predetermined value is a floor, above which the traffic is classified as uni-directional.

4. The method of claim 1, wherein the parameter is compressibility.

5. The method of claim 4, wherein the predetermined value is a ceiling, below which the traffic is classified as uni-directional.

6. The method of claim 1, further comprising:
    evaluating the traffic;
    identifying a pattern that is based, at least, on classifying content within the traffic; and
    classifying the traffic as uni-directional or bi-directional based on the pattern.

7. The method of claim 1, wherein the sender is a data center, the receiver is a branch office, and the network is a wide area network (WAN).

8. A non-transitory computer-readable medium/media that is encoded with logic that includes code for execution and when said logic is executed by a processor configured to perform operations for improving caching in data redundancy elimination (DRE) entities, said operations comprising:
    calculating a parameter for traffic propagating in a network between a sender and a receiver, wherein the parameter includes one or more network traffic characteristics which indicates whether the traffic is uni-directional network traffic or bi-directional network traffic, and the traffic comprises encoding information and decoding information;
    determining whether the parameter meets a predetermined value;
    classifying the traffic as uni-directional if the parameter meets the predetermined value; and
    classifying the traffic as bi-directional if the parameter does not meet the predetermined value;
    if the traffic is classified as uni-directional, causing a first DRE cache at the sender to maintain encoding information and to not maintain decoding information, and causing a second DRE cache at the receiver to maintain decoding information and to not maintain encoding information; and
    if the traffic is classified as bi-directional, causing the first DRE cache to maintain both encoding information and decoding information, and causing the second DRE cache to maintain both encoding information and decoding information.

9. The non-transitory computer readable medium/media of claim 8, wherein the parameter is entropy.

10. The non-transitory computer readable medium/media of claim 9, wherein the predetermined value is a floor, above which the traffic is classified as uni-directional.

11. The non-transitory computer readable medium/media of claim 8, wherein the parameter is compressibility.

12. The non-transitory computer readable medium/media of claim 11, wherein the predetermined value is a ceiling, below which the traffic is classified as uni-directional.

13. The non-transitory computer readable medium/media of claim 8, the operations further comprising:
    evaluating the traffic;
    identifying a pattern that is based, at least, on classifying content within the traffic; and
    classifying the traffic as uni-directional or bi-directional based on the pattern.

14. A system for improving caching in data redundancy elimination (DRE) entities, said operations, comprising:
    a memory element;
    a processor configured to execute instructions associated with electronic code; and
    one or more wide area application services (WAAS) modules configured to interface with the processor such that the system is configured for:
        calculating a parameter for traffic propagating in a network between a sender and a receiver, wherein the parameter includes one or more network traffic characteristics which indicates whether the traffic is likely uni-directional network traffic or bi-directional network traffic, and the traffic comprises encoding information and decoding information;
        determining whether the parameter meets a predetermined value;
        classifying the traffic as uni-directional if the parameter meets the predetermined value; and
        classifying the traffic as bi-directional if the parameter does not meet the predetermined value;
        if the traffic is classified as uni-directional, causing a first DRE cache at the sender to maintain encoding information and to not maintain decoding information, and causing a second DRE cache at the receiver to maintain decoding information and to not maintain encoding information; and
        if the traffic is classified as bi-directional, causing the first DRE cache to maintain both encoding information and decoding information, and causing the second DRE cache to maintain both encoding information and decoding information.

15. The system of claim 14, wherein the parameter is entropy, and wherein the predetermined value is a floor, above which the traffic is classified as uni-directional.

16. The system of claim 14, wherein the parameter is compressibility, and wherein the predetermined value is a ceiling, below which the traffic is classified as uni-directional.

17. The system of claim 14, wherein the system is further configured for:
   evaluating the traffic;
   identifying a pattern that is based, at least, on classifying content within the traffic; and
   classifying the traffic as uni-directional or bi-directional based on the pattern.

18. The system of claim 14, wherein the system is associated with a data center, and the network is a wide area network (WAN).

\* \* \* \* \*